(12) United States Patent
Xie

(10) Patent No.: US 12,520,214 B2
(45) Date of Patent: Jan. 6, 2026

(54) INFORMATION TRANSMISSION METHOD, INFORMATION RECEPTION METHOD AND APPARATUSES

(71) Applicants: China Mobile Communication Co., Ltd Research Institute, Beijing (CN); China Mobile Communications Group Co., Ltd., Beijing (CN)

(72) Inventor: Fang Xie, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 427 days.

(21) Appl. No.: 17/928,364

(22) PCT Filed: Jun. 9, 2021

(86) PCT No.: PCT/CN2021/099137
§ 371 (c)(1),
(2) Date: Nov. 29, 2022

(87) PCT Pub. No.: WO2021/249431
PCT Pub. Date: Dec. 16, 2021

(65) Prior Publication Data
US 2023/0217335 A1 Jul. 6, 2023

(30) Foreign Application Priority Data
Jun. 10, 2020 (CN) .......................... 202010525854.7

(51) Int. Cl.
*H04W 36/24* (2009.01)
*H04W 36/00* (2009.01)

(52) U.S. Cl.
CPC ....... *H04W 36/24* (2013.01); *H04W 36/0058* (2018.08)

(58) Field of Classification Search
None
See application file for complete search history.

(56) References Cited

U.S. PATENT DOCUMENTS

| 12,273,948 B2 * | 4/2025 | Chang ................... H04W 76/18 |
| 2011/0286399 A1 | 11/2011 | Chapman et al. |
| 2019/0223073 A1 | 7/2019 | Chen et al. |

(Continued)

FOREIGN PATENT DOCUMENTS

| CN | 110831079 A | 2/2020 |
| WO | 2014185139 A1 | 11/2014 |

(Continued)

OTHER PUBLICATIONS

U.S. Appl. No. 62/986,798: "Radio Network Nodes, User Equipment, and Methods Performed in a Communication Network" by DaSilva; pp. 1-48; filed on Mar. 9, 2020. (Year: 2020).*

(Continued)

*Primary Examiner* — Xavier S Wong
(74) *Attorney, Agent, or Firm* — Price Heneveld LLP

(57) ABSTRACT

An information transmission method includes: recording, by a UE, information related to Conditional HandOver and/or Conditional Pscell Change; and transmitting, by the UE, the information related to the Conditional HandOver and/or Conditional Pscell Change to a network.

20 Claims, 4 Drawing Sheets

(56) References Cited

U.S. PATENT DOCUMENTS

| | | | |
|---|---|---|---|
| 2019/0327641 A1* | 10/2019 | Mok | H04W 24/10 |
| 2019/0387440 A1 | 12/2019 | Yiu et al. | |
| 2020/0154321 A1 | 5/2020 | Kang et al. | |
| 2020/0163005 A1 | 5/2020 | Rao et al. | |
| 2020/0229054 A1 | 7/2020 | Lee | |
| 2021/0337449 A1* | 10/2021 | Zhu | H04L 5/001 |
| 2022/0007247 A1* | 1/2022 | Yang | H04W 36/0058 |
| 2022/0007254 A1* | 1/2022 | Da Silva | H04W 36/00838 |
| 2022/0386197 A1 | 12/2022 | Hwang et al. | |
| 2022/0394583 A1* | 12/2022 | Deenoo | H04W 76/20 |
| 2023/0156539 A1* | 5/2023 | Wu | H04W 76/19 370/331 |
| 2023/0189095 A1* | 6/2023 | Da Silva | H04W 76/19 455/437 |
| 2023/0239752 A1* | 7/2023 | Balan | H04W 36/0058 370/331 |

FOREIGN PATENT DOCUMENTS

| | | |
|---|---|---|
| WO | 2018031133 A1 | 2/2018 |
| WO | 2018203716 A1 | 11/2018 |
| WO | 2019108114 A1 | 6/2019 |
| WO | 2019137453 A1 | 7/2019 |
| WO | 2020091667 A1 | 5/2020 |
| WO | 2021062679 A1 | 4/2021 |
| WO | 2021067891 A1 | 4/2021 |

OTHER PUBLICATIONS

Catt, "stage-3 CR for Conditional PSCell Change for intra-SN without MN involvement", R2-2001043, 3GPP TSG-RAN WG2 Meeting #109 electronic, Feb. 24-Mar. 6, 2020, Elbonia.

Huawei, Hisilicon, "Discussion on conditional PSCell addition/change requirements", R4-2001574, 3GPP TSG-RAN WG4 Meeting #94-e, Feb. 24-Mar. 6, 2020, Online.

Ericsson, Other aspects of CHO, 6.9.3.3 Conditional handover—other aspects, 3GPP TSG-RAN WG2 #109-e, Tdod R2-2000332, Electronic meeting, Feb. 24-Mar. 6, 2020.

CMCC (Moderator), Email discussion on Rel-17 RA.N-centric data collection and utilization enhancement, 3GPP TSG-RAN meeting #86, RP-192603, 911'-Dec. 12, 2019, Sitges, Barcelona.

Huawei, Hisilicon, "Further discussion on Conditional HO", 3GPP TSG-RAN2 Meeting #101, R2-1802472 (Resubmission of R2-1800549), Feb. 26-Mar. 2, 2018, Athens, Greece.

Catt, "Discussion on Signaling Structure of CHO Configuration Message", 3GPP TSG-RAN WG2 Meeting #107bis, R2-1912136, Oct. 14-18, 2019, Chongqing, P.R. China.

Ericsson, "Conditional PSCell addition/change", 3GPP TSG-RAN WG2 #108, R2-1914637, Nov. 18-22, 2019, Reno, Nevada.

ZTE Corporation, Sanechips, "CHO triggering configuration", 3GPP TSG RAN WG2 Meeting #109e, R2-2001258 (revision of R2-1914813), Feb. 24-Mar. 6, 2020, Online.

* cited by examiner

INFORMATION TRANSMISSION METHOD, INFORMATION RECEPTION METHOD AND APPARATUSES

CROSS-REFERENCE TO RELATED APPLICATION

This application is the U.S. national phase of PCT Application No. PCT/CN2021/099137 filed on Jun. 9, 2021, which claims a priority of the Chinese patent application No. 202010525854.7 filed on Jun. 10, 2020, which are incorporated herein by reference in their entireties.

TECHNICAL FIELD

The present disclosure relates to the field of mobile communication technology, in particular to an information transmission method, an information reception method and apparatuses.

BACKGROUND

Conditional HandOver (CHO) is a mechanism for enhancing robustness of handover or secondary node addition. In order to solve the problem that it is impossible for a User Equipment (UE) to normally complete a handover or secondary node addition process when a channel between the UE and a serving cell deteriorates suddenly, a base station configures the UE to trigger measuring and reporting at a lower threshold, and a HandOver (HO) command or a secondary node addition command carries a higher threshold for triggering the handover as well as a random access resource to be used by the UE in a target cell. In this way, the base station receives a measurement report before the handover threshold has reached. Once the handover threshold has reached, the UE initiates a random access procedure to a target base station or cell. A source base station or cell could configure conditional handover for one or more target cells for the UE.

Similarly, Conditional Pscell Change (CPC) is a procedure in which a Master Node (MN) or Secondary Node (SN) at a network side transmits a condition for PSCell change to the UE in advance and the PSCell change is performed autonomously when the UE has measured that a target PSCell meets the condition. A Primary secondary cell (PS-Cell) is also called as a primary serving cell of a secondary cell group.

The CHO and the CPC are triggered automatically at a UE side when a measurement result of the UE satisfies an event configured by the network side, rather than being triggered through the handover command transmitted by the network side to the UE, so the network side does not know a specific time when the CHO or the CPC is triggered, a position where the UE is located and the measurement result of the UE. When two events are configured by the network side for the UE, the network side does not know the event which has been met to trigger the CHO or CPC. Hence, it is difficult for the network side to obtain relevant information when the CHO or the CPC is triggered, and thereby it is impossible to optimize the triggering event or the triggering procedure in accordance with the relevant information.

SUMMARY

An object of the present disclosure is to provide an information transmission method, a UE and a network device, so as to report relevant information for triggering CHO and/or CPC to a network side and help the network device to optimize a relevant event or procedure in accordance with the relevant information, thereby to improve the communication performance of a system.

In one aspect, the present disclosure provides in some embodiments an information transmission method, including: recording, by a UE, information related to CHO and/or CPC; and transmitting, by the UE, the information related to the CHO and/or CPC to a network. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

In a possible embodiment of the present disclosure, the information related to the beam measured when the triggering event is triggered includes at least one of beam Identities (IDs) of a serving cell, a target cell and a neighboring cell, beam measurement results, or the quantity of beams whose quality exceeds a predetermined threshold in each cell. The serving cell and the target cell include a PCell and/or a PSCell. The indicator information corresponding to the triggering event includes at least one of a measurement quantity, a type of a reference signal, TimeToTrigger, a threshold corresponding to the triggering event, a hysteresis, or an amount of offset.

In a possible embodiment of the present disclosure, the transmitting, by the UE, the information related to the CHO and/or CPC to the network includes transmitting, by the UE in an idle state, an inactive state, a connected state or a procedure of being switched to the connected state, the information related to the CHO and/or CPC.

In a possible embodiment of the present disclosure, the information related to the CHO and/or CPC is transmitted through a random access report, a connection establishment report, a radio link failure report or a predefined message.

In a possible embodiment of the present disclosure, the transmitting the information related to the CHO and/or CPC includes transmitting, by the UE, the information related to the CHO and/or CPC to the network on its own initiative, or transmitting, by the UE, the information related to the CHO and/or CPC to the network upon the reception of a request message from the network.

In a possible embodiment of the present disclosure, prior to receiving the request message from the network, the information transmission method further includes transmitting, by the UE, a log of the information related to the CHO and/or CPC to the network.

In a possible embodiment of the present disclosure, prior to recording the information related to the CHO and/or CPC, the information transmission method further includes:

receiving configuration information from the network, and configuring the information related to the CHO and/or CPC to be recorded by the UE in accordance with the configuration information; or configuring the information related to the CHO and/or CPC to be recorded by the UE in accordance with locally pre-stored information.

In another aspect, the present disclosure provides in some embodiments an information reception method, including receiving, by a network side device, information related to CHO and/or CPC from a UE. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

In a possible embodiment of the present disclosure, the information related to the beam measured when the triggering event is triggered includes at least one of beam IDs of a serving cell, a target cell and a neighboring cell, beam measurement results, or the quantity of beams whose quality exceeds a predetermined threshold in each cell. The serving cell and the target cell include a PCell and/or a PSCell. The indicator information corresponding to the triggering event includes at least one of a measurement quantity, a type of a reference signal, TimeToTrigger, a threshold corresponding to the triggering event, a hysteresis, or an amount of offset.

In a possible embodiment of the present disclosure, prior to receiving the information related to the CHO and/or CPC from the UE, the information reception method further includes transmitting configuration information to the UE so as to configure the information related to the CHO and/or CPC to be recorded by the UE.

In a possible embodiment of the present disclosure, the information related to the CHO and/or CPC is transmitted through a random access report, a connection establishment report, a radio link failure report or a predefined message.

In a possible embodiment of the present disclosure, the receiving the information related to the CHO and/or CPC from the UE includes receiving the information related to the CHO and/or CPC transmitted by the UE on its own initiative, or transmitting a request message to the UE and receiving the information related to the CHO and/or CPC transmitted in accordance with the request message.

In a possible embodiment of the present disclosure, prior to transmitting the request message to the UE, the information reception method further includes receiving a log of the information related to the CHO and/or CPC from the UE.

In a possible embodiment of the present disclosure, subsequent to receiving the information related to the CHO and/or CPC from the UE, the information reception method further includes optimizing events and parameters for the CHO and/or CPC in accordance with the information related to the CHO and/or CPC, a Random Access Channel (RACH) report and Radio Link Failure (RLF) report information.

In yet another aspect, the present disclosure provides in some embodiments a UE, including: a recording module configured to record information related to CHO and/or CPC; and a transmission module configured to transmit the information related to the CHO and/or CPC to a network. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

In a possible embodiment of the present disclosure, the UE further includes a configuration module configured to: receive configuration information from the network, and configure the information related to the CHO and/or CPC to be recorded by the UE in accordance with the configuration information; or configure the information related to the CHO and/or CPC to be recorded by the UE in accordance with locally pre-stored information.

In still yet another aspect, the present disclosure provides in some embodiments a UE, including a transceiver and a processor. The processor is configured to record information related to CHO and/or CPC. The transceiver is configured to transmit the information related to the CHO and/or CPC to a network. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

In still yet another aspect, the present disclosure provides in some embodiments a UE, including a processor, a memory, and a program stored in the memory and executed by the processor. The program is executed by the processor so as to implement the steps of the above-mentioned information transmission method.

In still yet another aspect, the present disclosure provides in some embodiments a network side device, including a reception module configured to receive information related to CHO and/or CPC from a UE. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

In a possible embodiment of the present disclosure, the network side device further includes an optimization module configured to optimize events and parameters for the CHO and/or CPC in accordance with the information related to the CHO and/or CPC, an RACH report and Radio Link Failure (RLF) report information.

In still yet another aspect, the present disclosure provides in some embodiments a network side device, including a transceiver and a processor. The transceiver is configured to receive information related to CHO and/or CPC from a UE. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

In still yet another aspect, the present disclosure provides in some embodiments a network side device, including a processor, a memory, and a program stored in the memory and executed by the processor. The program is executed by the processor so as to implement the steps of the above-mentioned information reception method.

In still yet another aspect, the present disclosure provides in some embodiments a computer-readable storage medium storing therein a program. The program is executed by a processor so as to implement the steps of the above-mentioned methods.

According to the information transmission method, the information reception method and the apparatuses in the embodiments of the present disclosure, as compared with the related art, the UE records the relevant information when the CHO and/or CPC is triggered, and transmits the information to the network so as to notify the network side of a specific triggering event for the CHO and/or CPC. As a result, it is able to help the network side to optimize the relevant event or procedure in accordance with the information, thereby to improve the communication performance of the system.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings.

DETAILED DESCRIPTION

Figure 1:
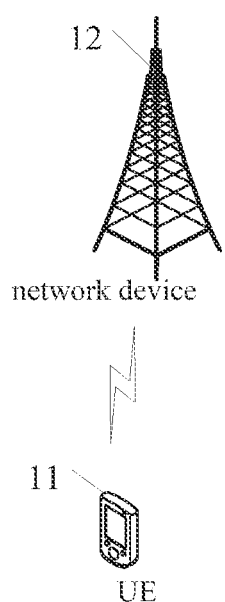
FIG. 1 is a schematic view showing an application scenario according to one embodiment of the present disclosure.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or"

involved in the specification and the appended claims may represent at least one of listed items.

The technology described in the context shall not be limited to a New Radio (NR) system and a Long Term Evolution (LTE)/LTE-Advanced (LTE-A) system, and it may also be applied to various wireless communication systems, e.g., Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), or any other system. The terms "system" and "network" may be replaced with each other. The CDMA system may be used to implement such radio technologies as CDMA2000 and Universal Terrestrial Radio Access (UTRA). The UTRA may include Wideband Code Division Multiple Access (WCDMA) and the other CDMA variants. The TDMA system may be used to implement such a radio technology as Global System for Mobile Communication (GSM). The OFDMA system may be used to implement such radio technologies as Ultra Mobile Broadband (UMB), Evolved-UTRA (E-UTRA), IEEE 802.11 (Wireless Fidelity (Wi-Fi)), IEEE 802.16 (WiMAX), IEEE 802.20, and Flash-OFDM. The UTRA and the E-UTRA are parts of a Universal Mobile Telecommunications System (UMTS). The LTE and a more advanced LTE (e.g., LTE-A) are new UMTS versions using the E-UTRA. The UTRA, E-UTRA, UMTS, LTE, LTE-A and GSM have been described in literatures from the $3^{rd}$-Generation Partnership Project (3GPP). The technology described in the context may be applied to the above-mentioned systems and radio technologies, or applied to the other systems and radio technologies. However, a New Radio (NR) system has been described illustratively hereinafter, and terms for the NR system have been used in most of the description, although these technologies may also be applied to the systems other than the NR system.

The following description is given for illustrative purposes but shall not be construed as limiting the scope, applicability or configuration set forth in the appended claims. Any alterations may be made on functions and arrangements of the discussed elements without departing from the spirit and scope of the present disclosure. Various procedures or assemblies may be omitted, replaced or added appropriately in the examples. For example, steps of the described method may be performed in an order different from that described in the context, and some steps may be added, omitted or combined. In addition, the features described with reference to some examples may be combined in the other examples.

FIG. 1 is a block diagram of an applicable wireless communication system according to one embodiment of the present disclosure. The wireless communication system includes a terminal 11 and a base station 12. The terminal 11 may also be called as a UE, and it may be a terminal side device such as a mobile phone, a tablet personal computer, a laptop computer, a Personal Digital Assistant (PDA), a Mobile Internet Device (MID), a wearable device or a vehicle-mounted device. It should be appreciated that, the specific type of the terminal 11 will not be particularly defined herein. The base station 12 may be a base station and/or a core network element. The base station may be a $5^{th}$-Generation (5G) base station or a future base station (e.g., gNB, 5G NR NB), or a base station in the other communication system (e.g., eNB, Wireless Local Area Network (WLAN) access point, or any other access point). The base station may be called as node B, evolved node B, access point, Base Transceiver Station (BTS), radio base station, radio transceiver, Basic Service Set (BSS), Extended service Set (ESS), home node B, evolved home node B, WLAN access point, WiFi node or any other appropriate term in the field. The base station shall not be limited to a specific technical term, as long as a same technical effect is achieved. It should be appreciated that, merely the base station in the NR system is taken as an example in the embodiments of the present disclosure, but a specific type of the base station will not be particularly defined herein.

The base station may communicate with the terminal 11 under the control of a base station controller. In various examples, the base station controller may be a part of a core network or some base stations. Some base stations may exchange control information or user data with the core network through backhaul. In some examples, some of the base stations may directly or indirectly communicate with each other through a backhaul link, and the backhaul link may be a wired or wireless communication link. The wireless communication system may support operations on a plurality of carriers (waveform signals at different frequencies). A multi-carrier transmitter may transmit modulated signals on the plurality of carriers simultaneously. For example, each communication link may be a multi-carrier signal modulated using various radio technologies. Each modulated signal may be transmitted on different carriers and may carry control information (e.g., reference signal or control channel), overhead information, data, etc.

The base station may communicate with the terminal 11 in a wireless manner via one or more access points. Each base station may provide a communication coverage at a corresponding coverage region. A coverage region for an access point may be a sector merely constituting a part of the coverage region. The wireless communication system may include various base stations (e.g., macro base station, micro base station, or pico base station). The base station may also use different radio technologies, e.g., cellular or WLAN radio access technology. The base station may be associated with same or different access network or operator deployments. The coverage regions of different base stations (including the coverage regions of the base stations of a same type or different types, the coverage regions using same or different radio technologies, or the coverage regions belonging to same or different access networks) may overlap each other.

A communication link in the wireless communication system may include an uplink for carrying uplink (UL) transmission (e.g., from the terminal 11 to the base station 12), or a downlink for carrying downlink (DL) transmission (e.g., from the base station 12 to the terminal 11). The UL transmission may also be called as reverse link transmission, and the DL transmission may also be called as forward link transmission. The downlink transmission may be performed using a licensed frequency band, a non-licensed frequency band or both. Similarly, the uplink transmission may be performed using the licensed frequency band, the non-licensed frequency band or both.

Figure 2:
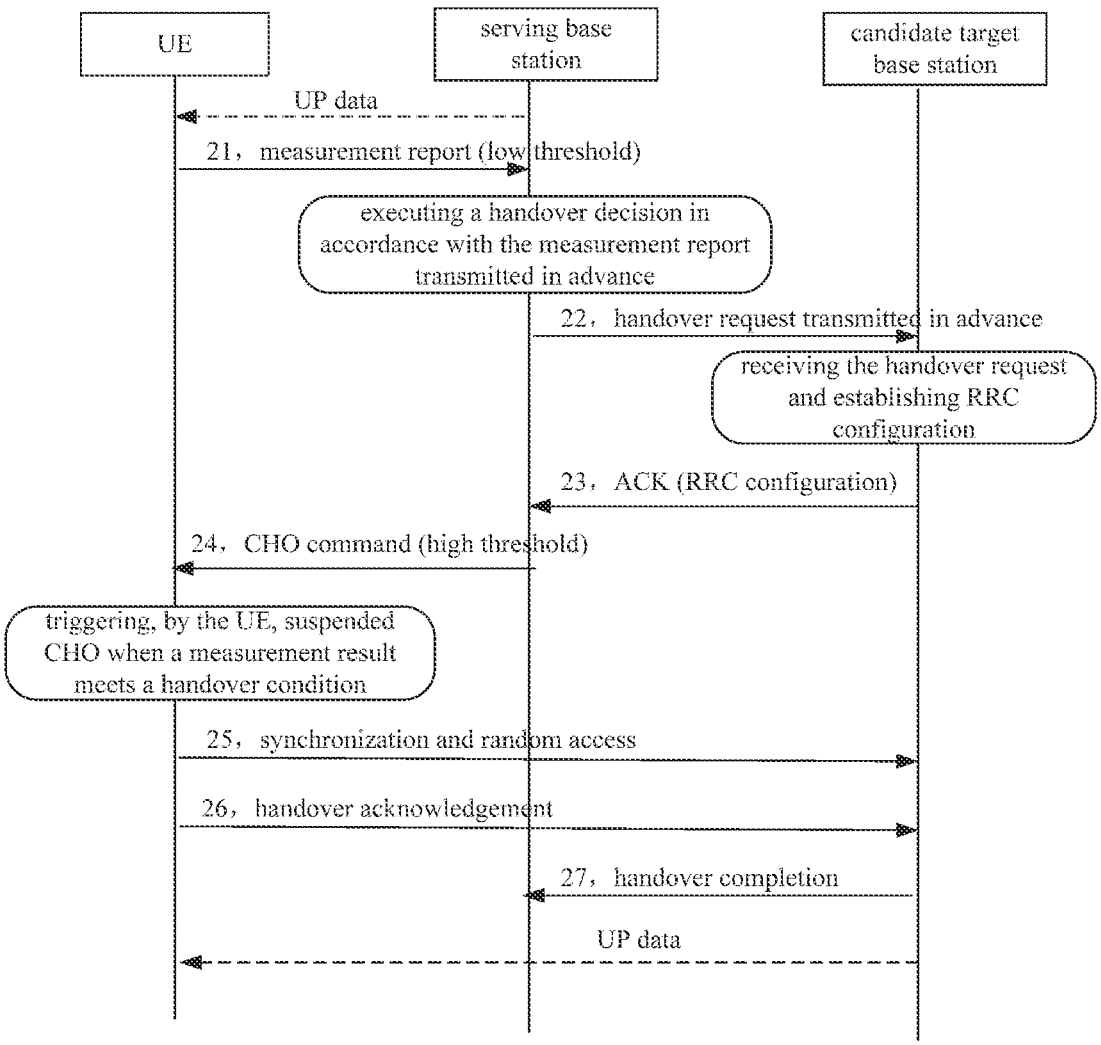
FIG. 2 is an exemplary flow chart of CHO in the related art.

FIG. 2 is an exemplary flow chart of CHO in the related art. The UE performs measuring and reporting at a low threshold configured by the base station (Step 21). A serving base station makes a handover decision in accordance with a measurement report reported by the UE in advance, and transmits a handover request to a candidate target base station in advance (Step 22). The target base station receives the handover request, establishes a Radio Resource Control (RRC) configuration, and transmits a handover acknowledge message to a source base station (Step 23). A source base station transmits a CHO command based on a certain higher threshold to the UE (Step 24). Upon the reception of the CHO command from the source base station, the UE temporarily suspend the handover, triggers the CHO when a measurement result reaches the higher threshold, and initiates synchronization and a random access procedure (Step 25). A handover procedure is completed subsequently through a specific handover procedure (Steps 26 to 27).

In the CHO procedure, a handover event configured by each candidate target base station may be an event A3, an event A5 or both. The event A3 refers to an event where signal quality of a neighboring cell is better than that of PCell/PSCell and an amount of offset, and the event A5 refers to an event where the signal quality of the PCell/PSCell is worse than an absolute threshold1 and the signal quality of the neighboring cell/SCell is better than another absolute threshold2.

Correspondingly, the network side needs to configure a measurement quantity corresponding to the triggering event, i.e., one of Reference Signal Received Power (RSRP), Reference Signal Received Quality (RSRQ) or Signal-to-Noise and Interference Ratio (SINR), and also needs to configure TimeToTrigger (TTT), thresholds (including a3-Offset, a5-Threshold1 and a5-Threshold2), hysteresis and amounts of offset (Ofn, Ocn, Ofp and Ocp).

The CHO and the CPC are triggered when the measurement result of the UE conforms to the event configured at the network side, rather than being triggered through a handover command transmitted by the network side to the UE, so the network side does not know a specific time when the CHO or the CPC is triggered, a position where the UE is located and the measurement result of the UE. When two events are configured by the network side for the UE, the network side does not know the event through which the CHO or CPC is triggered. Due to the lack of the above-mentioned information, it is difficult for the network side to optimize the event or procedure.

In order to solve at least one of the above-mentioned problems, the present disclosure provides in some embodiments an information transmission method. A UE records and reports relevant information when an event is triggered in CHO and CPC, so as to help a network side to optimize the event, configuration-related parameters and a corresponding procedure, thereby to reduce the similar failures occurring subsequently.

In the embodiments of the present disclosure, when the event is triggered, it may also be considered as that the event or condition is fulfilled, i.e., the triggering of event is also called as fulfillment of event or condition. Correspondingly, a triggering order is also called as a fulfillment order, and a TTT is called as time to satisfy.

Figure 3:
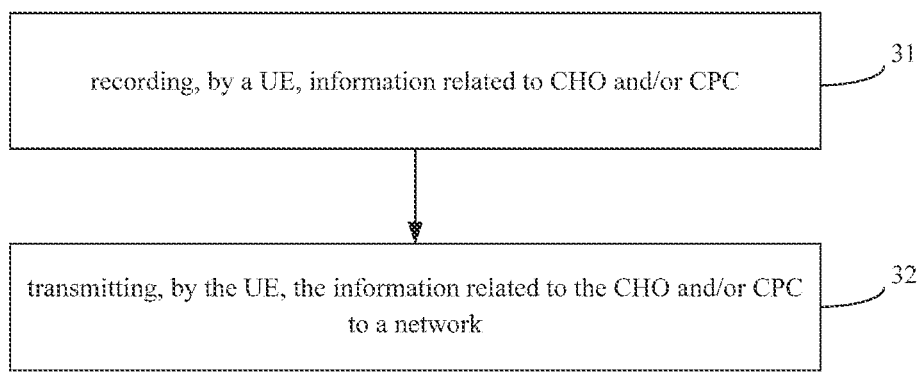
FIG. 3 is a flow chart of an information transmission method for a UE side according to one embodiment of the present disclosure.

As shown in FIG. 3, the present disclosure provides in some embodiments an information transmission method for a UE side, which includes the following steps.

Step 31: recording, by a UE, information related to CHO and/or CPC.

Here, the information related to the CHO and/or CPC includes at least one of the followings.

1) A triggering event for the CHO and/or CPC, the triggering event including at least one of an event A3 or an event A5. For example, the triggering event includes an event A3, an event A5 or both.

2) Information related to beams measured when the triggering event is triggered. To be specific, the information related to the beam measured when the triggering event is triggered includes at least one of beam IDs of a serving cell, a target cell and a neighboring cell, beam measurement results, or the quantity of beams whose quality exceeds a predetermined threshold in each cell. The serving cell and the target cell include a PCell and/or a PSCell.

3) Indicator information corresponding to the triggering event. To be specific, the indicator information corresponding to the triggering event includes at least one of a measurement quantity (e.g., RSRP, RSRQ or SINR), a type of a reference signal (e.g., Synchronization Signal (SS)/Physical Broadcast Channel (PBCH) block or Channel State Information-Reference Signal (CSI-RS)), TimeToTrigger (TTT), a threshold corresponding to the triggering event (e.g., a3-Offset, a5-Threshold1, a5-Threshold2), a hysteresis, or an amount of offset (e.g., Ofn).

4) In the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively.

For example, the information specifically includes: 4A) an event triggered firstly, e.g., an RSRP-based event A3; 4B) information about an event not triggered when the triggering event is triggered, e.g., the event A5 (which is also not indicated explicitly), a running situation of the TTT, a measurement quantity used for the event A5 (e.g., RSRP, RSRQ or SINR), a type of a reference signal (e.g., SS/PBCH block or CSI-RS), cell-level and beam-level measurement results of a quantity (e.g., RSRQ) of the to-be-measured serving cell or neighboring cell, the quantity of beams, etc.; 4C) information about a previous triggering event when a current triggering event is triggered, e.g., the event A3, a running situation of the TTT (not stopping timing after the event A3 is triggered), a measurement quantity used for the event A3 (e.g., RSRP, RSRQ or SINR), a type of a reference signal (e.g., SS/PBCH block or CSI-RS), cell-level and beam-level measurement results of a quantity (e.g., RSRQ) of the to-be-measured serving cell or neighboring cell, the quantity of beams, etc.; or 4D) a time difference between a time when a current triggering event is triggered and a time when a previous triggering event was triggered.

5) In the case that the CPC has been configured, nodes for configuring the information related to the CPC, the node including an MN and an SN, both of which are used to configure the CPC for the UE.

6) In the case that the CHO and the CPC have been configured simultaneously, information for indicating a current scenario, the current scenario being the CHO or CPC.

Step 32: transmitting, by the UE, the information related to the CHO and/or CPC to a network.

Here, the UE transmits the information related to the CHO and/or CPC to the network when the UE is in an idle state, an inactive state, a connected state or a procedure of being switched to the connected state. For example, the UE transmits the information through a random access report, a connection establishment report, an RLF report or a predefined message.

Through the above-mentioned steps, the UE records the relevant information when the CHO and/or CPC is triggered, and transmits the information to the network so as to notify, the network side of a specific triggering event for the CHO and/or CPC. As a result, it is able to help the network side to optimize the relevant event or procedure in accordance with the information, thereby to improve the communication performance of the system.

In at least one embodiment of the present disclosure, the information related to the CHO and/or CPC further includes at least one of the followings.

7) Information related to cells measured when the triggering event is triggered. The cells include a serving cell, a target cell and a neighboring cell obtained through measurement. The serving cell and the target cell include a PCell and/or a PSCell. The information related to the cells includes cell-level information such as a cell ID, a cell measurement result and a beam ID.

8) Information about a time when the CHO and/or CPC is triggered and a position of the UE, a measurement result of a Wireless Local Area Network (WLAN) and/or BLUEtooth, etc.

In at least one embodiment of the present disclosure, the transmitting, by the UE, the information related to the CHO and/or CPC specifically includes transmitting, by the UE, the information related to the CHO and/or CPC to the network on its own initiative. For example, the UE transmits the information to the network in accordance with a predetermined time cycle, or when the locally-recorded information has reached a predetermined quantity.

In at least one embodiment of the present disclosure, the transmitting, by the UE, the information related to the CHO and/or CPC also includes transmitting, by the UE, the information related to the CHO and/or CPC to the network in response to a request message received from the network. In a possible embodiment of the present disclosure, prior to receiving the request message from the network, the information transmission method further includes transmitting, by the UE, a log of the information related to the CHO and/or CPC to the network. For example, when the locally-recorded information related to the CHO and/or CPC meets a predetermined condition, the UE transmits the log to the network. The predetermined condition includes that the locally-recorded information has reached a predetermined quantity or preset specific information has been recorded.

In the embodiments of the present disclosure, the information to be recorded by the UE is configured by the network. To be specific, the UE receives configuration information from the network, and configures the information related to the CHO and/or CPC to be recorded by the UE in accordance with the configuration information. As another implementation mode, the information to be recorded is pre-agreed. For example, certain configuration information is locally pre-stored in the UE, and the UE configures the information related to the CHO and/or CPC to be recorded by the UE in accordance with the locally pre-stored information.

The above description is given with respect to the information transmission method from the UE side, and the following description will be given from the network side.

Figure 4:
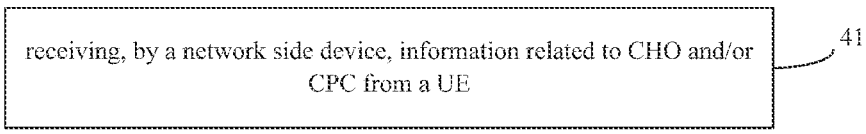
FIG. 4 is a flow chart of an information reception method for a network side according to one embodiment of the present disclosure.

As shown in FIG. 4, the present disclosure provides in some embodiments an information reception method for a network side device. The network side device is a base station, a network management device or a Trace Collection Entity (TCE). The information reception method includes Step 41 of receiving, by a network side device, information related to CHO and/or CPC from a UE.

Here, the information related to the CHO and/or CPC includes at least one of the followings.

1) A triggering event for the CHO and/or CPC, the triggering event including at least one of an event A3 or an event A5. For example, the triggering event includes an event A3, an event A5 or both.

2) Information related to beams measured when the triggering event is triggered. To be specific, the information related to the beam measured when the triggering event is triggered includes at least one of beam IDs of a serving cell, a target cell and a neighboring cell, beam measurement results, or the quantity of beams whose quality exceeds a predetermined threshold in each cell. The serving cell and the target cell include a PCell and/or a PSCell.

3) Indicator information corresponding to the triggering event. To be specific, the indicator information corresponding to the triggering event includes at least one of a measurement quantity (e.g., RSRP, RSRQ or SINR), a type of a reference signal (e.g., SS/PBCH block or CSI-RS), TTT, a threshold corresponding to the triggering event (e.g., a3-Offset, a5-Threshold1, a5-Threshold2), a hysteresis, or an amount of offset (e.g., Ofn).

4) In the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively.

For example, the information specifically includes: 4A) an event triggered firstly, e.g., an RSRP-based event A3; 4B) information about an event not triggered when the triggering event is triggered, e.g., the event A5 (which is also not displayed and indicated), a timing situation of the TTT, a measurement quantity used for the event A5 (e.g., RSRP, RSRQ or SINR), a type of a reference signal (e.g., SS/PBCH block or CSI-RS), cell-level and beam-level measurement results of a quantity (e.g., RSRQ) of the to-be-measured serving cell or neighboring cell, the quantity of beams, etc.; 4C) information about a previous triggering event when a current triggering event is triggered, e.g., the event A3, a timing situation of the TTT (not stopping timing after the event A3 is triggered), a measurement quantity used for the event A3 (e.g., RSRP, RSRQ or SINR), a type of a reference signal (e.g., SS/PBCH block or CSI-RS), cell-level and beam-level measurement results of a quantity (e.g., RSRQ) of the to-be-measured serving cell or neighboring cell, the quantity of beams, etc.; or 4D) a time difference between a time when a current triggering event is triggered and a time when a previous triggering event was triggered.

5) In the case that the CPC has been configured, nodes for configuring the information related to the CPC, the node including an MN and an SN, both of which are used to configure the CPC for the UE.

6) In the case that the CHO and the CPC have been configured simultaneously, information for indicating a current scenario, the current scenario being the CHO or CPC.

Through the above-mentioned step, the network side device receives the specific triggering event when the CHO and/or CPC is triggered, so as to determine a specific cause when the CHO and/or CPC is triggered by the UE, thereby to provide reference information for the optimization of a next event or procedure.

In at least one embodiment of the present disclosure, the information related to the CHO and/or CPC further includes at least one of the followings.

7) Information related to cells measured when the triggering event is triggered. The cells include a serving cell, a target cell and a neighboring cell obtained through measurement. The serving cell and the target cell include a PCell and/or a PSCell. The information related to the cells includes cell-level information such as a cell ID, a cell measurement result and a beam ID.

8) Information about a time when the CHO and/or CPC is triggered and a position of the UE, a measurement result of a WLAN and/or BLUE tooth, etc.

In a possible embodiment of the present disclosure, prior to Step 41, the network side device further transmits configuration information to the UE so as to configure the information related to the CHO and/or CPC to be recorded by the UE.

In Step 41, the network side device receives the information related to the CHO and/or CPC transmitted by the UE on its own initiative, or transmits a request message to the UE and then receives the information related to the CHO and/or CPC transmitted by the UE in response to the request message. In a possible embodiment of the present disclosure, prior to transmitting the request message, the network side device further receives a log of the information related to the CHO and/or CPC from the UE, and then transmits the request message to the UE in accordance with the log.

Subsequent to Step 41, the network side device further optimizes events and parameters for the CHO and/or CPC in accordance with the information related to the CHO and/or CPC, an RACH report and RLF report information, which specifically includes at least one of the followings.

1) When the network side device determines that the UE has triggered the CHO and has been switched to a target cell in accordance with the information related to the CHO and/or CPC, the network side device determines that the UE is switched to a source cell again after it is switched to the target cell in accordance with the RACH report or the RLF report information, and a time interval between the two switching is smaller than a predetermined time threshold, the network side device may adjust a threshold for the relevant event for the triggering the CHO, so as to increase the triggering threshold for the relevant event.

For example, when the network side device determines that the UE has performed the too early handover based on the event A3 or the event A5, i.e., the UE has triggered the CHO, but a radio link failure occurs rapidly and the UE is switched to an original cell again after the UE has been switched to the target cell, the network side device may increase the threshold for the handover, e.g., increase a3-Offset, decrease a5-Threshold1, increase a5-Threshold2, increase TTT, etc.

2) When the network side device determines that the UE has triggered the CHO and has been switched to a target cell in accordance with the information related to the CHO and/or CPC, the network side device determines that the UE is switched to a cell other than a source cell after it is switched to the target cell in accordance with the RACH report or the RLF report information, and a time interval between the two switching is smaller than a predetermined time threshold, the network side device may adjust a threshold for the relevant event for the triggering the CHO, so as to decrease the triggering threshold for the relevant event.

For example, when the network side device determines that the UE has performed the too late handover based on the event A3 or the event A5, i.e., an RLF occurs for the UE in a serving cell and the UE is switched to another cell, the network side device may decrease the threshold for the handover, e.g., decrease a3-Offset, increase a5-Threshold1, decrease a5-Threshold2, increase TTT, etc.

3) When the network side device determines that a time interval between the triggering of the event A3 and the event A5, which are configured simultaneously by the network side, is greater than a predetermined time length in accordance with the information related to the CHO and/or CPC, the network side device increases a triggering threshold for the event triggered firstly, and/or decreases a triggering threshold for the event triggered subsequently.

For example, when the event A3 and the event A5 are configured simultaneously by the network side device for the UE but there is a very large time interval between the triggering of the two events. e.g., when A5 is triggered long after A3 has been triggered, it means that the event A3 has no effect, or the CHO and/or CPC merely depends on the event A5. At this time, it is necessary to increase the triggering threshold for A3 or decrease the triggering threshold for A5, so that the two events cooperate with each other in a better manner.

4) The network side device determines whether the to-be-adjusted event is for the CHO or the CPC accurately in accordance with the information related to the CHO or CPC reported by the UE.

5) The network side device notifies the MN or the SN to adjust parameters of the corresponding event in accordance with whether the configuration information reported by the UE comes from the MN or SN.

The methods have been described hereinabove, and the corresponding devices will be described hereinafter.

Figure 5:
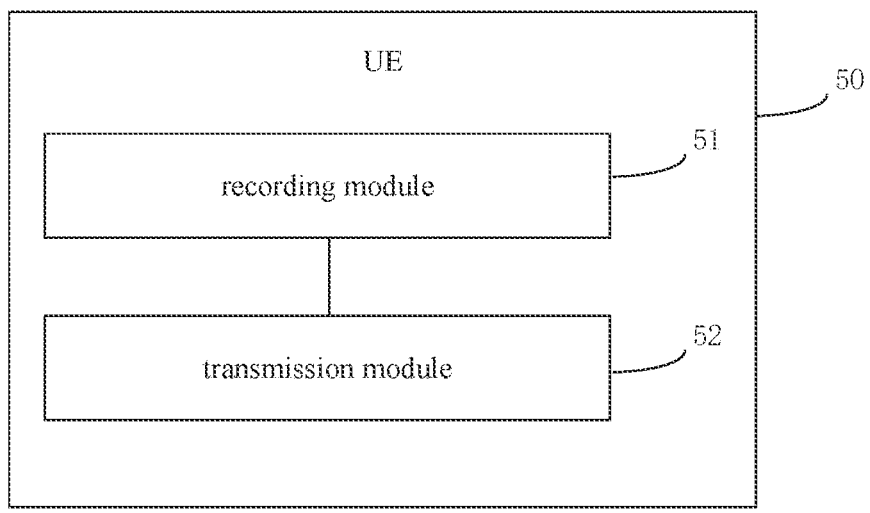
FIG. 5 is a schematic view showing a UE according to one embodiment of the present disclosure.

As shown in FIG. 5, the present disclosure provides in some embodiments a UE 50, which includes: a recording module 51 configured to record information related to CHO and/or CPC; and a transmission module 52 configured to transmit the information related to the CHO and/or CPC to a network. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

In a possible embodiment of the present disclosure, the information related to the beam measured when the triggering event is triggered includes at least one of beam IDs of a serving cell, a target cell and a neighboring cell, beam measurement results, or the quantity of beams whose quality exceeds a predetermined threshold in each cell. The serving cell and the target cell include a PCell and/or a PSCell. The indicator information corresponding to the triggering event includes at least one of a measurement quantity, a type of a reference signal, TimeToTrigger, a threshold corresponding to the triggering event, a hysteresis, or an amount of offset.

In a possible embodiment of the present disclosure, the transmission module is further configured to transmit the information related to the CHO and/or CPC when the UE in an idle state, an inactive state, a connected state or a procedure of being switched to the connected state.

In a possible embodiment of the present disclosure, the information related to the CHO and/or CPC is transmitted through a random access report, a connection establishment report, a radio link failure report or a predefined message.

In a possible embodiment of the present disclosure, the transmission module is further configured to transmit the information related to the CHO and/or CPC to the network on its own initiative, or transmit the information related to the CHO and/or CPC to the network upon the reception of a request message from the network.

In a possible embodiment of the present disclosure, the transmission module is further configured to transmit a log of the information related to the CHO and/or CPC to the network.

In a possible embodiment of the present disclosure, the UE further includes a configuration module configured to: receive configuration information from the network, and configure the information related to the CHO and/or CPC to be recorded by the UE in accordance with the configuration information; or configure the information related to the CHO and/or CPC to be recorded by the UE in accordance with locally pre-stored information.

It should be appreciated that, the UE in the embodiments of the present disclosure is a device corresponding to the information transmission method in FIG. 3, and the implementation of the UE may refer to that of the information transmission method mentioned hereinabove with a same technical effect. The UE in the embodiments of the present disclosure is used to implement all the steps of the information transmission method mentioned hereinabove with a same technical effect, which will thus not be particularly defined herein.

Figure 6:
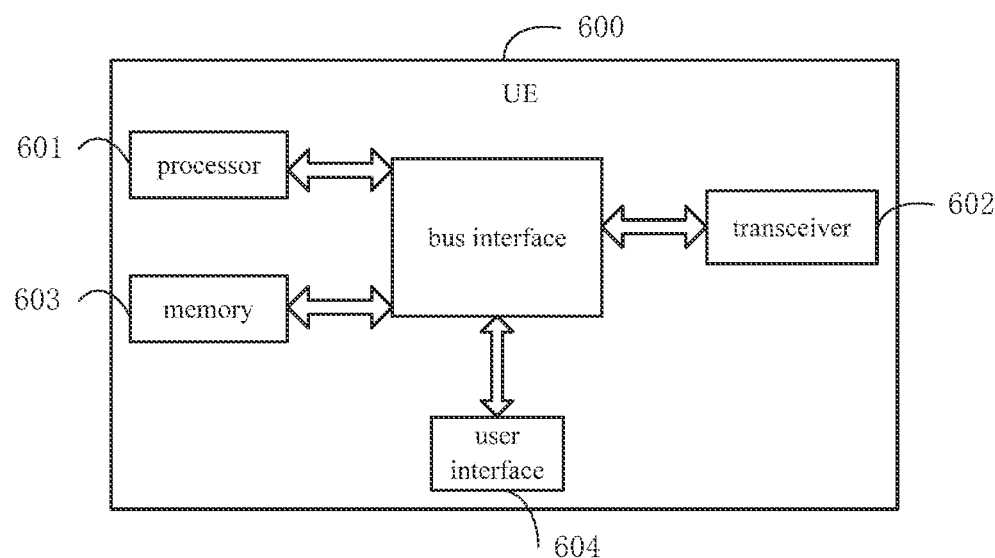
FIG. 6 is another schematic view showing the UE according to one embodiment of the present disclosure.

As shown in FIG. 6, the present disclosure provides in some embodiments a UE 600, which includes a processor 601, a transceiver 602, a memory 603, a user interface 604 and a bus interface.

In the embodiments of the present disclosure, the UE 600 further includes a program stored in the memory 603 and executed by the processor 601.

The processor 601 is configured to execute the program, so as to: record information related to CHO and/or CPC; and transmit the information related to the CHO and/or CPC to a network. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

It should be appreciated that, in the embodiments of the present disclosure, the program is executed by the processor 601 so as to implement the information transmission method in FIG. 3 with a same technical effect, which will not be particularly defined herein.

In FIG. 6, bus architecture may include a number of buses and bridges connected to each other, so as to connect various circuits for one or more processors 601 and one or more memories 603. In addition, as is known in the art, the bus architecture may be used to connect any other circuits, such as a circuit for a peripheral device, a circuit for a voltage stabilizer and a power management circuit. The bus interface may be provided, and the transceiver 602 may consist of a plurality of elements, i.e., a transmitter and a receiver for communication with any other devices over a transmission medium. With respect to different UEs, the user interface 604 may also be provided for devices which are to be arranged inside or outside the UE, and these devices may include but not limited to a keypad, a display, a speaker, a microphone and a joystick.

The processor 601 may take charge of managing the bus architecture as well as general processings. The memory 603 may store therein data for the operation of the processor 601.

It should be appreciated that, the UE in the embodiments of the present disclosure is a device corresponding to the information transmission method in FIG. 3, and the implementation of the UE may refer to that of the information transmission method mentioned hereinabove with a same technical effect. In the UE, the transceiver 602 is in communication with the memory 603 and the processor 601 via the bus interface. A function of the processor 601 may also be implemented through the transceiver 602, and a function of the transceiver 602 may also be implemented through the processor 601. It should be further appreciated that, the UE in the embodiments of the present disclosure is used to implement all the steps of the information transmission method mentioned hereinabove with a same technical effect, which will thus not be particularly defined herein.

The present disclosure further provides in some embodiments a computer-readable storage medium storing therein a program. The program is executed by a processor so as to: record information related to CHO and/or CPC; and transmit the information related to the CHO and/or CPC to a network. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

The program is executed by the processor so as to implement the above-mentioned information transmission method for the UE side with a same technical effect, which will not be particularly defined herein.

Figure 7:
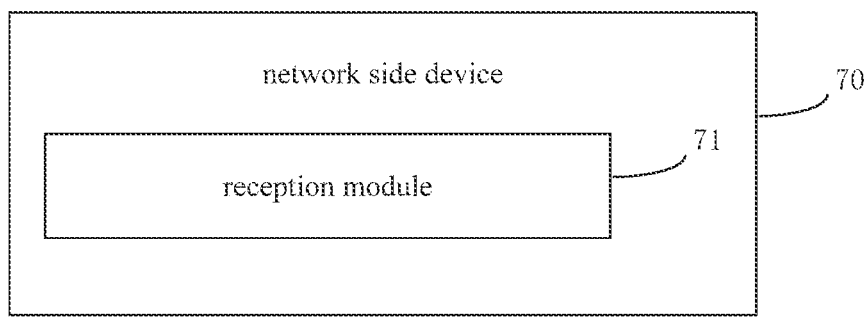
FIG. 7 is a schematic view showing a network side device according to one embodiment of the present disclosure.

As shown in FIG. 7, the present disclosure further provides in some embodiments a network side device 70, which includes a reception module 71 configured to receive information related to CHO and/or CPC from a UE. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

In a possible embodiment of the present disclosure, the information related to the beam measured when the triggering event is triggered includes at least one of beam IDs of a serving cell, a target cell and a neighboring cell, beam measurement results, or the quantity of beams whose quality exceeds a predetermined threshold in each cell. The serving cell and the target cell include a PCell and/or a PSCell. The indicator information corresponding to the triggering event includes at least one of a measurement quantity, a type of a reference signal, TimeToTrigger, a threshold corresponding to the triggering event, a hysteresis, or an amount of offset.

In a possible embodiment of the present disclosure, the network side device further includes a transmission module configured to transmit configuration information to the UE so as to configure the information related to the CHO and/or CPC to be recorded by the UE.

In a possible embodiment of the present disclosure, the information related to the CHO and/or CPC is transmitted through a random access report, a connection establishment report, a radio link failure report or a predefined message.

In a possible embodiment of the present disclosure, the reception module is further configured to receive the information related to the CHO and/or CPC transmitted by the UE on its own initiative, or transmit a request message to the UE and receive the information related to the CHO and/or CPC transmitted by the UE in accordance with the request message.

In a possible embodiment of the present disclosure, the reception module is further configured to receive a log of the information related to the CHO and/or CPC from the UE.

In a possible embodiment of the present disclosure, the network side device further includes an optimization module configured to optimize events and parameters for the CHO and/or CPC in accordance with the information related to the CHO and/or CPC, an RACH report and RLF report information.

It should be appreciated that, the network side device in the embodiments of the present disclosure is a device corresponding to the information reception method in FIG. 4, and the implementation of the network side device may refer to that of the information reception method mentioned hereinabove with a same technical effect. The network side device in the embodiments of the present disclosure is used to implement all the steps of the information reception method mentioned hereinabove with a same technical effect, which will thus not be particularly defined herein.

Figure 8:
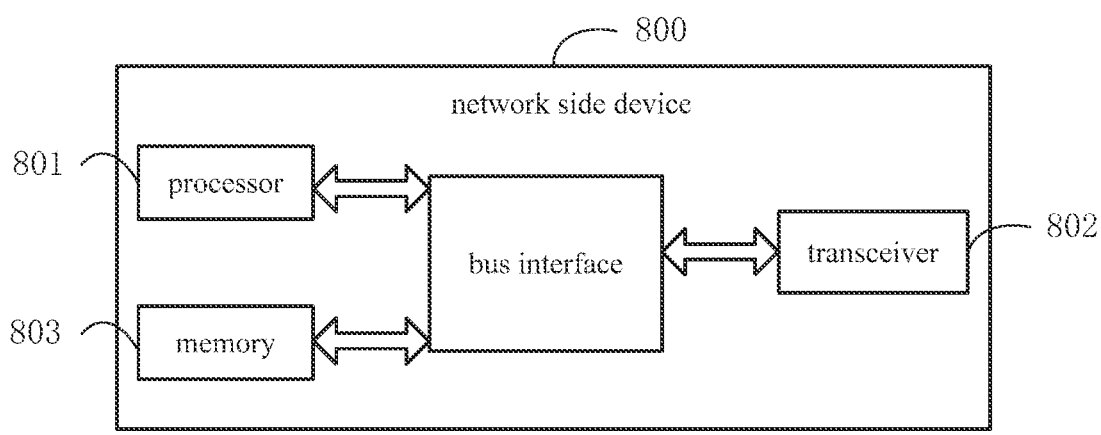
FIG. 8 is another schematic view showing the network side device according to one embodiment of the present disclosure.

As shown in FIG. 8, the present disclosure further provides in some embodiments a network side device 800, which includes a processor 801, a transceiver 802, a memory 803 and a bus interface.

In the embodiments of the present disclosure, the network side device 800 further includes a program stored in the memory 803 and executed by the processor 801. The program is executed by the processor 801, so as to receive information related to CHO and/or CPC from a UE. The information related to the CHO and/or CPC includes at least one of: a triggering event for the CHO and/or CPC, the triggering event including at least one of an event A3 or an event A5; information related to beams measured when the triggering event is triggered; indicator information corresponding to the triggering event; in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively; in the case that the CPC has been configured, nodes for configuring the information related to the CPC, the node including an MN and an SN; or in the case that the CHO and the CPC have been configured simultaneously, information for indicating a current scenario, the current scenario being the CHO or CPC.

It should be appreciated that, in the embodiments of the present disclosure, the program is executed by the processor 801 so as to implement the information reception method in FIG. 4 with a same technical effect, which will not be particularly defined herein.

In FIG. 8, bus architecture may include a number of buses and bridges connected to each other, so as to connect various circuits for one or more processors 801 and one or more memories 803. In addition, as is known in the art, the bus architecture may be used to connect any other circuits, such as a circuit for a peripheral device, a circuit for a voltage stabilizer and a power management circuit. The bus interface may be provided, and the transceiver 802 may consist of a plurality of elements, i.e., a transmitter and a receiver for communication with any other devices over a transmission medium.

The processor 801 may take charge of managing the bus architecture as well as general processings. The memory 803 may store therein data for the operation of the processor 801.

It should be appreciated that, the network side device in the embodiments of the present disclosure is a device corresponding to the information reception method in FIG. 4, and the implementation of the network side device may refer to that of the information reception method mentioned hereinabove with a same technical effect. In the network side device, the transceiver 802 is in communication with the memory 803 and the processor 801 via a bus interface. A function of the processor 801 may also be implemented through the transceiver 802, and a function of the transceiver 802 may also be implemented through the processor 801. It should be further appreciated that, the network side device in the embodiments of the present disclosure is used to implement all the steps of the information reception method mentioned hereinabove with a same technical effect, which will thus not be particularly defined herein.

The present disclosure further provides in some embodiments a computer-readable storage medium storing therein a program. The program is executed by a processor so as to receive information related to CHO and/or CPC from a UE.

The program is executed by the processor so as to implement the above-mentioned information reception method for the network side device with a same technical effect, which will thus not be particularly defined herein.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information transmission method, comprising:
recording, by a User Equipment (UE), information related to at least one of Conditional HandOver (CHO) or Conditional Pscell Change (CPC); and
transmitting, by the UE, the information related to the at least one of CHO or CPC to a network,
wherein the information related to the at least one of CHO or CPC comprises at least one of:
a triggering event for the at least one of CHO or CPC, the triggering event comprising at least one of an event A3 or an event A5;
in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively;
in the case that the CPC has been configured, nodes for configuring the information related to the CPC, the node comprising a Master Node (MN) and a Secondary Node (SN).

2. The information transmission method according to claim 1, wherein the information related to the at least one of CHO or CPC further comprises the information related to the beam(s) measured when the triggering event is triggered, wherein the information related to the beam(s) measured when the triggering event is triggered comprises at least one of beam Identities (IDs) of a serving cell, a target cell and a neighboring cell, beam measurement results, or the quantity of beams whose quality exceeds a predetermined threshold in each cell;
the serving cell and the target cell comprise at least one of a Primary Cell (PCell) or a Primary Secondary Cell (PSCell); and
wherein the information related to the at least one of CHO or CPC further comprises the indicator information corresponding to the triggering event, the indicator information corresponding to the triggering event comprises at least one of a measurement quantity, a type of a reference signal, TimeToTrigger, a threshold corresponding to the triggering event, a hysteresis, or an amount of offset.

3. The information transmission method according to claim 1, wherein the transmitting, by the UE, the information related to the at least one of CHO or CPC to the network comprises transmitting, by the UE in an idle state, an inactive state, a connected state or a procedure of being switched to the connected state, the information related to the at least one of CHO or CPC.

4. The information transmission method according to claim 3, wherein the information related to the at least one of CHO or CPC is transmitted through a random access report, a connection establishment report, a radio link failure report or a predefined message.

5. The information transmission method according to claim 3, wherein the transmitting the information related to the at least one of CHO or CPC comprises transmitting, by the UE, the information related to the at least one of CHO or CPC to the network on its own initiative, or transmitting, by the UE, the information related to the at least one of CHO or CPC to the network upon the reception of a request message from the network.

6. The information transmission method according to claim 5, wherein prior to receiving the request message from the network, the information transmission method further comprises transmitting, by the UE, a log of the information related to the at least one of CHO or CPC to the network.

7. The information transmission method according to claim 1, wherein prior to recording the information related to the at least one of CHO or CPC, the information transmission method further comprises: receiving configuration information from the network, and configuring the information related to the at least one of CHO or CPC to be recorded by the UE in accordance with the configuration information; or configuring the information related to the at least one of CHO or CPC to be recorded by the UE in accordance with locally pre-stored information.

8. An information reception method, comprising receiving, by a network side device, information related to at least one of Conditional HandOver (CHO) or Conditional Pscell Change (CPC) from a User Equipment (UE), which is configured to record information related to the at least one of CHO or CPC,
wherein the information related to the at least one of CHO or CPC comprises at least one of:
a triggering event for the at least one of CHO or CPC, the triggering event comprising at least one of an event A3 or an event A5;
in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively;
in the case that the CPC has been configured, nodes for configuring the information related to the CPC, the node comprising a Master Node (MN) and a Secondary Node (SN).

9. The information reception method according to claim 8, wherein the information related to the at least one of CHO or CPC further comprises the information related to the beam(s) measured when the triggering event is triggered, wherein the information related to the beam(s) measured when the triggering event is triggered comprises at least one of beam Identities (IDs) of a serving cell, a target cell and a neighboring cell, beam measurement results, or the quantity of beams whose quality exceeds a predetermined threshold in each cell;
the serving cell and the target cell comprise at least one of a Primary Cell (PCell) or a Primary Secondary Cell (PSCell); and
wherein the information related to the at least one of CHO or CPC further comprises the indicator information corresponding to the triggering event, the indicator information corresponding to the triggering event comprises at least one of a measurement quantity, a type of a reference signal, TimeToTrigger, a threshold corresponding to the triggering event, a hysteresis, or an amount of offset.

10. The information reception method according to claim 8, wherein prior to receiving the information related to the at least one of CHO or CPC from the UE, the information reception method further comprises transmitting configuration information to the UE so as to configure the information related to the at least one of CHO or CPC to be recorded by the UE.

11. The information reception method according to claim 10, wherein the information related to the at least one of CHO or CPC is transmitted through a random access report, a connection establishment report, a radio link failure report or a predefined message.

12. The information reception method according to claim 10, wherein the receiving the information related to the at least one of CHO or CPC from the UE comprises receiving the information related to the at least one of CHO or CPC transmitted by the UE on its own initiative, or transmitting a request message to the UE and receiving the information related to the at least one of CHO or CPC transmitted in accordance with the request message.

13. The information reception method according to claim 12, wherein prior to transmitting the request message to the UE, the information reception method further comprises receiving a log of the information related to the at least one of CHO or CPC from the UE.

14. The information reception method according to claim 8, wherein subsequent to receiving the information related to the at least one of CHO or CPC from the UE, the information reception method further comprises optimizing events and parameters for the at least one of CHO or CPC in accordance with the information related to the at least one of CHO or CPC, a Random Access Channel (RACH) report and Radio Link Failure (RLF) report information.

15. A network side device, comprising a processor, a memory, and a program stored in the memory and executed by the processor, wherein the program is executed by the processor so as to implement the steps of the information reception method according to claim 8.

16. The network side device according to claim 15, wherein the information related to the beam measured when the triggering event is triggered comprises at least one of beam Identities (IDs) of a serving cell, a target cell and a neighboring cell, beam measurement results, or the quantity of beams whose quality exceeds a predetermined threshold in each cell;
the serving cell and the target cell comprise at least one of a Primary Cell (PCell) or a Primary Secondary Cell (PSCell); and
the indicator information corresponding to the triggering event comprises at least one of a measurement quantity, a type of a reference signal, TimeToTrigger, a threshold corresponding to the triggering event, a hysteresis, or an amount of offset.

17. The network side device according to claim 15, wherein prior to receiving the information related to the at least one of CHO or CPC from the UE, the information reception method further comprises transmitting configuration information to the UE so as to configure the information related to the at least one of CHO or CPC to be recorded by the UE.

18. A User Equipment (UE), comprising a transceiver and a processor, wherein the processor is configured to record information related to at least one of Conditional HandOver (CHO) or Conditional Pscell Change (CPC), and the transceiver is configured to transmit the information related to the at least one of CHO or CPC to a network,
wherein the information related to the at least one of CHO or CPC comprises at least one of:
a triggering event for the at least one of CHO or CPC, the triggering event comprising at least one of an event A3 or an event A5;
in the case that the event A3 and the event A5 are configured simultaneously, at least one of a triggering order of the event A3 and the event A5, a time elapsed between the triggering of event A3 and the triggering of event A5, measurement information and indicator information corresponding to a second event when a first event is triggered, or measurement information and indicator information corresponding to the first event when the second event is triggered, the first event and the second event being events in the event A3 and the event A5 triggered successively;
in the case that the CPC has been configured, nodes for configuring the information related to the CPC, the node comprising a Master Node (MN) and a Secondary Node (SN).

19. The UE according to claim 18, wherein the information related to the at least one of CHO or CPC further comprises the information related to the beam(s) measured when the triggering event is triggered, wherein the information related to the beam(s) measured when the triggering event is triggered comprises at least one of beam Identities (IDs) of a serving cell, a target cell and a neighboring cell, beam measurement results, or the quantity of beams whose quality exceeds a predetermined threshold in each cell;
the serving cell and the target cell comprise at least one of a Primary Cell (PCell) or a Primary Secondary Cell (PSCell); and
wherein the information related to the at least one of CHO or CPC further comprises the indicator information corresponding to the triggering event, the indicator information corresponding to the triggering event comprises at least one of a measurement quantity, a type of a reference signal, TimeToTrigger, a threshold corresponding to the triggering event, a hysteresis, or an amount of offset.

20. The UE according to claim 18, wherein the transceiver is further configured to transmit, by the UE in an idle state, an inactive state, a connected state or a procedure of being switched to the connected state, the information related to the at least one of CHO or CPC.

* * * * *